No. 676,488.  
Patented June 18, 1901.

A. W. BROWNE.
SELF OILING PULLEY.
(Application filed Dec. 22, 1900.)

(No Model.)

WITNESSES:  
Theodore B. Vaill  
Robinson L. Vaill

INVENTOR:  
Arthur W. Browne,  
by Edward F. Simpson, Jr.  
Attorney

UNITED STATES PATENT OFFICE.

ARTHUR W. BROWNE, OF PRINCE'S BAY, NEW YORK, ASSIGNOR TO THE S. S. WHITE DENTAL MANUFACTURING COMPANY, OF PHILADELPHIA, PENNSYLVANIA.

SELF-OILING PULLEY.

SPECIFICATION forming part of Letters Patent No. 676,488, dated June 18, 1901.

Application filed December 22, 1900. Serial No. 40,715. (No model.)

*To all whom it may concern:*

Be it known that I, ARTHUR W. BROWNE, a citizen of the United States, residing at Prince's Bay, in the county of Richmond and State of New York, have invented a certain new and useful Improvement in Self-Oiling Pulleys; and I do hereby declare the following to be a full, clear, and exact description of the invention, such as will enable others skilled in the art to which it appertains to make and use the same.

My invention relates to a certain improvement in pulleys of the class commonly known as "self-oiling" pulleys.

The object of my invention is to provide a pulley of this description with simple means for keeping itself properly lubricated for an indefinite period of time.

My improvement will first be described with the aid of the accompanying drawings and then pointed out in the claim.

Figure 1:
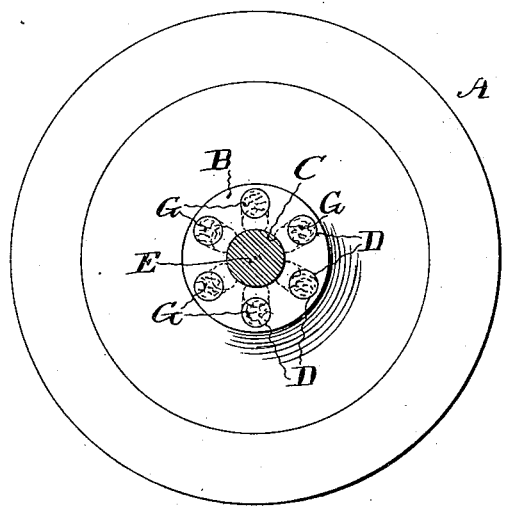
Figure 2:
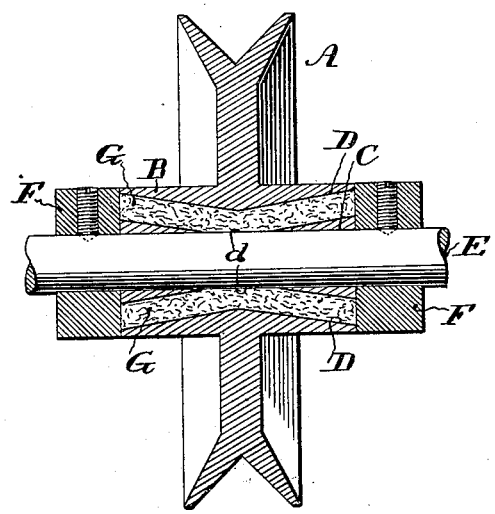

In said drawings, Figure 1 is a view in side elevation of an idler-pulley provided with my improvement. Fig. 2 is a sectional view thereof, the section being taken centrally and longitudinally of the hub of the pulley.

The drawings represent a loose belt or cord pulley A of ordinary construction, with the exception that its hub B is constructed according to my invention. This hub is preferably extended on opposite sides of the pulley, and in addition to the usual central bore C is formed with one or more ducts D, extending longitudinally through the hub. The duct D at some point in its length communicates with the bore C, as at $d$. The best way now known to me of making a duct of this character is to incline it from its outer ends inwardly toward the bore until at preferably the center of the hub the duct opens into the bore, as at $d$.

While a single duct will make effective the purpose of my invention, as hereinafter explained, the efficiency of the improved pulley is greatly increased by providing it with a plurality of ducts arranged concentrically in relation to the bore C, as shown.

The pulley when mounted for use is fitted to turn upon a shaft, as E, and is held in position thereon by collars F F or other suitable means adjacent to the opposite ends of the hub. The ducts are designed to be filled with some suitable fibrous material adapted to be saturated with lubricant. Cotton-waste in the form of wicks G has been found to be suitable for the purpose. It will be seen that the wicks bear against the shaft through the openings $d$, and also bear at their opposite ends against the collars F F. When the pulley is rotated, oil will be fed to the shaft through the moist wicks at the point where they come in contact with said shaft, and capillary attraction aided by the motion of the pulley will cause the oil to move in opposite directions toward the ends of the hub, the oil passing out between the ends of the hub and the collars being arrested and collected by the ends of the wicks. The oil thus continuously circulates through the wicks along the shaft and between the ends of the hub and collars and is used over and over again. By means of this circulation of the oil the pulley-bearings may be properly lubricated during a long period of use upon a single charge of oil, and the outside of the pulley, collars, and shaft kept clean and free from waste oil. Hence the pulley will be maintained in proper running order with but little attention and infrequent recharging with oil, whereby time, attention, and lubricant are economized.

The construction involving the duct or ducts is advantageous, for the reason not only that it is simple to make, but because the insertion of the wicks may be effected with great facility and ease, it only being necessary to thread the wicks through the ducts with the aid of a bent wire or needle, the collars being removed for that purpose.

Obviously the pulley may be recharged with lubricant either by removing the old wicks and inserting fresh ones, which are then suitably saturated with oil, or fresh oil may be applied to the wicks through the spaces between the ends of the hub and the collars, which collars need not be placed so near the ends of the hub as represented in the drawings.

I claim as my invention—

A pulley having a hub provided with a central bore through which passes the shaft on which the pulley is mounted, and a plurality of ducts arranged concentrically in relation to said bore and extending longitudinally through said hub, said ducts being inclined from their outer ends inwardly toward said bore with which they communicate, whereby wicks inserted in said ducts will bear upon said shaft at the points where said ducts communicate with said bore, substantially as and for the purpose described.

In testimony whereof I affix my signature in presence of two witnesses.

ARTHUR W. BROWNE.

Witnesses:
W. LITTELL WHITE,
H. E. HARRIS.